United States Patent

Okubo et al.

[11] Patent Number: 5,480,596
[45] Date of Patent: Jan. 2, 1996

[54] OPTICAL RECORDING MEDIUM SUBSTRATE SHEET PRODUCING APPARATUS HAVING ROLL STAMPER WITH ELASTOMER LAYER OF PREDETERMINED HARDNESS

[75] Inventors: Yukitoshi Okubo; Tsuyoshi Santoh; Miki Tamura, all of Yokohama; Chieko Mihara, Kawasaki; Hiroyuki Sugata, Yamato; Osamu Kanome, Kawasaki; Masataka Yashima, Yokohama, all of Japan

[73] Assignee: Canon Kabushiki Kaisha, Tokyo, Japan

[21] Appl. No.: 345,339

[22] Filed: Nov. 21, 1994

Related U.S. Application Data

[63] Continuation of Ser. No. 45,306, Apr. 12, 1993, abandoned, which is a continuation of Ser. No. 879,450, May 1, 1992, abandoned, which is a continuation of Ser. No. 549,912, Jul. 9, 1990, abandoned.

[30] Foreign Application Priority Data

Jul. 12, 1989 [JP] Japan ................................. 1-180831
Sep. 21, 1989 [JP] Japan ................................. 1-243386

[51] Int. Cl.⁶ ......................... B29D 11/00; B29C 59/04
[52] U.S. Cl. .................. 264/1.33; 249/114.1; 249/135; 264/1.36; 264/1.6; 264/106; 264/145; 264/284; 425/174.4; 425/296; 425/308; 425/385; 425/810; 425/363
[58] Field of Search ..................... 264/1.33, 145, 264/1.34, 153, 1.36, 1.6, 2.7, 22, 106, 107, 284, 293; 249/114.1, 135; 118/620, 641, 419, 407, 244; 425/94, 104, 105, 296, 174.4, 308, 385, 810, 363

[56] References Cited

U.S. PATENT DOCUMENTS

| 3,072,519 | 1/1963 | Salzman | 425/810 |
| 3,636,147 | 1/1972 | Rowland | 264/284 |
| 3,893,795 | 7/1975 | Nauta | 425/385 |
| 4,097,634 | 6/1978 | Bergh | 425/385 |
| 4,211,743 | 7/1980 | Nauta et al. | 425/385 |
| 4,231,730 | 11/1980 | Birt | 425/810 |
| 4,238,179 | 12/1980 | Llabres et al. | 425/810 |
| 4,294,782 | 10/1981 | Froehliz | 264/106 |
| 4,587,066 | 5/1986 | Rodriguez | 264/106 |
| 4,836,874 | 6/1989 | Foster | 264/106 |
| 4,968,370 | 11/1990 | Watkins | 264/106 |

FOREIGN PATENT DOCUMENTS

| 0288580 | 11/1988 | European Pat. Off. . |
| 59-071835 | 4/1984 | Japan . |
| 62-132619 | 6/1987 | Japan . |
| 63-20694 | 4/1988 | Japan . |
| 506504 | 5/1988 | WIPO . |
| WO03311 | 5/1988 | WIPO . |

OTHER PUBLICATIONS

Japanese Industrial Standard, JIS K 7215 (1986).

Primary Examiner—Mathieu D. Vargot
Attorney, Agent, or Firm—Fitzpatrick, Cella, Harper & Scinto

[57] ABSTRACT

An apparatus and method for producing an optical recording medium or an optical recording medium substrate sheet forms an photo-curable resin layer on at least one of a substrate sheet and a stamper which undergoes elastic deformation. The stamper bears a pattern corresponding with preformatting information and is brought into close contact with the substrate sheet wherein the photo-curable resin layer is interposed between them and cured.

8 Claims, 4 Drawing Sheets

OPTICAL RECORDING MEDIUM SUBSTRATE SHEET PRODUCING APPARATUS HAVING ROLL STAMPER WITH ELASTOMER LAYER OF PREDETERMINED HARDNESS

This application is a continuation of application Ser. No. 08/045,306 filed Apr. 12, 1993, now abandoned; which in turn is a continuation of application Ser. No. 07/879,450 filed May 1, 1992, now abandoned, which in turn is a continuation of application Ser. No. 07/549,912 filed Jul. 9, 1990, now abandoned.

BACKGROUND OF THE INVENTION

1. Field of the Invention

The present invention relates to an apparatus for continuously producing a substrate sheet for optical recording mediums used in optically recording and reproducing information using a laser beam or the like. It also relates to a process for continuously producing a substrate sheet for optical recording mediums by the use of the apparatus. The present invention further relates to an apparatus for producing an optical recording medium, and a process for producing an optical recording medium by the use of the apparatus.

2. Related Background Art

In optical recording mediums such as optical disks and optical cards, optically detectable minute pits of several pm, for example, from 1 μm to 10 μm, are formed in a track on a thin recording layer provided on a substrate, and thus information can be recorded in a high density. In such optical recording mediums, a laser beam must be scanned along the track when the information is recorded and reproduced. For this purpose, a substrate with guide grooves for tracking is commonly used.

Methods of preparing such guide grooves or a substrate provided with guide grooves are known to include a compression molding process in which a softened plastic material is pressed using a stamper followed by curing, an injection molding process in which a molten plastic material is injected into a mold provided with e stamper followed by curing, and a 2P (photo-polymerization) process in which guide grooves are transferred from a stamper by the use of a photopolymer. Of these, the 2P process is one of superior processes for preparing substrates in view of the advantages that guide grooves can be readily transferred, substrates have a good solvent resistance, and substrates can be made to have less optical distortion.

More specifically, the superior solvent resistance of a substrate is advantageous when a recording layer is formed by coating, using an organic material as a recording material. For example, when a substrate is prepared by the 2P process, it is possible to use a solvent that can not be used in a substrate comprised of usual plastics such as acrylate and polycarbonate because of its power to dissolve the surface of the substrate. Hence, it becomes possible to use a recording material having a good solubility to the solvent, so that the recording material can be selected from a vast range of materials. The 2P process also has a great advantage that it requires only a very little investment in equipment, compared with other processes.

Compared with other processes, however, the 2P process requires a longer production time per sheet of substrates, and has been involved in the problem that it is not suited for mass-production. Under such circumstances, a proposal, as disclosed in Japanese National Publication (of translated version) No. 62-506504, has been made on a technique by which, using a master on which patterns of pits or grooves have been formed, the patterns are transferred and formed on a film substrate so that substrates for film-like optical recording mediums can be continuously produced.

A conventional method for producing substrates for optical recording mediums will be described below with reference to the accompanying drawing. FIG. 4 illustrates the structure of an apparatus used in forming guide grooves on a substrate according to a conventional method. In FIG. 4, a substrate sheet 1 fed from feed rolls 2 is delivered along the circumference of a roll stamper 3 on which guide grooves or preformat patterns corresponding with information are formed. A nip roll 8 has the function of pressing the substrate sheet 1 against the surface of the roll stamper 3. A resin tank 10 containing a liquid ultraviolet-curable resin 9, curable as a result of exposure to ultraviolet rays, is provided beneath the roll stamper 3. In this resin tank 10, a coating roll 11 is provided which rotates in pressure contact with the roll stamper 3. The liquid ultraviolet-curable resin 9 is coated by this coating roll 11 on the surface of the roll stamper 3. The ultraviolet-curable resin 9 thus coated is held between the substrate sheet 1 and the roll stamper 3 by the action of the nip roll 8. An ultraviolet lamp 13 is provided above the nip roll 8, and the ultraviolet-curable resin 9 held between the substrate sheet 1 and the roll stamper 3 is irradiated with ultraviolet rays so that the ultraviolet-curable resin is cured. A delivery roll 14 has the function of peeling from the roll stamper 3 the substrate sheet 1 and the layer of the ultraviolet-curable resin having been cured in a fixed state to the substrate sheet. Thus, preformat patterns of optical disks are transferred to the substrate sheet.

When, however, the ultraviolet-curable resin and the substrate are laminated according to the above method, the coating surface of the resin and the substrate are in liquid-solid contact, and there has been involved in the problem that bubbles tend to be included when they are brought into contact.

Moreover, guide grooves of the roll stamper or preformat patterns corresponding with information are required to be formed in an accuracy of a submicroscopic order. It, however, has been not so easy to eliminate, in a greater accuracy, rotational irregularities of a DC motor for diving the roll stamper and rotational irregularities caused by gears. This has been one of the causes of the troubles that may bring about eccentricities, defects and recording errors of recording mediums.

SUMMARY OF THE INVENTION

The present invention was made in view of the above problems. Accordingly, an object of the present invention is to provide an apparatus for producing continuously and in a high productivity a substrate sheet for optical recording mediums, that employs as the roll stamper a roll stamper capable of undergoing elastic deformation, thereby preventing bubbles from being included in a photo-curable resin layer and between the photo-curable resin layer and the substrate sheet, and is improved in the follow-up action between a roll stamper and a substrate sheet so that the rate of errors can be decreased, and also to provide a process for producing the substrate sheet making use of such an apparatus.

Another object of the present invention is to provide an apparatus, and a process, for producing continuously and in a high productivity optical recording mediums, that can prevent bubbles from being included in a photo-curable resin layer and between the photo-curable resin layer and the substrate sheet, thereby decreasing the rate of errors.

The apparatus of the present invention for producing a substrate sheet for optical recording mediums is an apparatus comprising;

a means for forming an photo-curable resin layer on at least one of a substrate sheet and a roll stamper having thereon a pattern corresponding with preformatting information;

a means for bringing the substrate sheet into close contact with the roll stamper, interposing said photo-curable resin layer between them; and a means for curing said photo-curable resin layer; said roll stamper being so formed as to undergo elastic deformation.

The process of the present invention for producing a substrate sheet for optical recording mediums is a process comprising the steps of;

forming an photo-curable resin layer on at least one of a substrate sheet and a roll stamper having thereon a pattern corresponding with preformatting information;

bringing the substrate sheet into close contact with the roll stamper, interposing said photo-curable resin layer between them;

irradiating said photo-curable resin layer with light to transfer said pattern to the photo-curable resin layer, and at the same time fixing said photo-curable resin layer to the substrate sheet; and peeling from the roll stamper the substrate sheet on which a photo-cured resin layer has been fixed;

said roll stamper being so formed as to undergo elastic deformation.

The apparatus of the present invention for producing an optical recording medium is an apparatus comprising continuously;

a means for melting a resin and extruding the molten resin to form a resin sheet;

a means for forming a photo-curable resin layer on at least one of a substrate sheet and a roll stamper having thereon a pattern corresponding with preformatting information;

a means for bringing the substrate sheet into close contact with the roll stamper, interposing said photo-curable resin layer between them;

a means for curing said photo-curable resin layer;

a means for peeling from the roll stamper the substrate sheet on which a photo-cured resin layer has been fixed;

a means for forming a recording layer on the surface of the substrate sheet on which said pattern has been formed;

a means for forming a protective member on the surface on which said recording layer has been formed; and a means for individually cutting said substrate sheet having said recording layer and protective member;

said roll stamper being so formed as to undergo elastic deformation.

The process of the present invention for producing an optical recording medium is a process comprising continuously the steps of;

melting a resin and extruding the molten resin to form a resin sheet;

forming a photo-curable resin layer on at least one of a substrate sheet and a roll stamper having thereon a pattern corresponding with preformatting information;

bringing the substrate sheet into close contact with the roll stamper, interposing said photo-curable resin layer between them;

curing said photo-curable resin layer to fix the layer to said substrate sheet;

peeling from the roll stamper the substrate sheet on which a photo-cured resin layer has been fixed;

forming a recording layer on the surface of the substrate sheet on which said pattern has been formed;

forming a protective member on the surface on which said recording layer has been formed; and individually cutting said substrate sheet having said recording layer and protective member;

said roll stamper being so formed as to undergo elastic deformation.

Referring again to the prior art, U.S. Pat. No. 3,636,147 and Japanese Patent Publication No. 20694/1988 disclose that a roll having an elastic surface is used as a press roll used in embossing on a resin sheet. In the manufacture of an optical recording medium using a 2P resin, however, the 2P resin is in a liquid state, and hence no step is provided in which a great pressure is applied as in the molding of the above resin film. Thus, there has been no 2P molding in which a roll stamper is so constituted as to undergo elastic deformation. The present inventors have found that in the manufacture of a substrate sheet according to the 2P molding, for an optical recording medium having a very fine and regular pattern of preformatting information, employment of a roll stamper capable of undergoing elastic deformation makes it possible for bubbles to be greatly suppressed from occurring when a substrate sheet is brought into close contact with a roll stamper interposing a photo-curable resin layer between them. The present invention has been thus accomplished.

DESCRIPTION OF THE PREFERRED EMBODIMENTS

The present invention will be described below in detail with reference the drawings.

In the present invention, a roll stamper capable of undergoing elastic deformation is used as the roll stamper so that bubbles can be readily prevented from their inclusion in a photo-curable resin layer held between the substrate sheet and the roll stamper. In addition, the follow-up of the roll stamper to the substrate sheet is improved against fine rotational irregularities or vibrations so that medium errors can be readily decreased.

Figure 1:
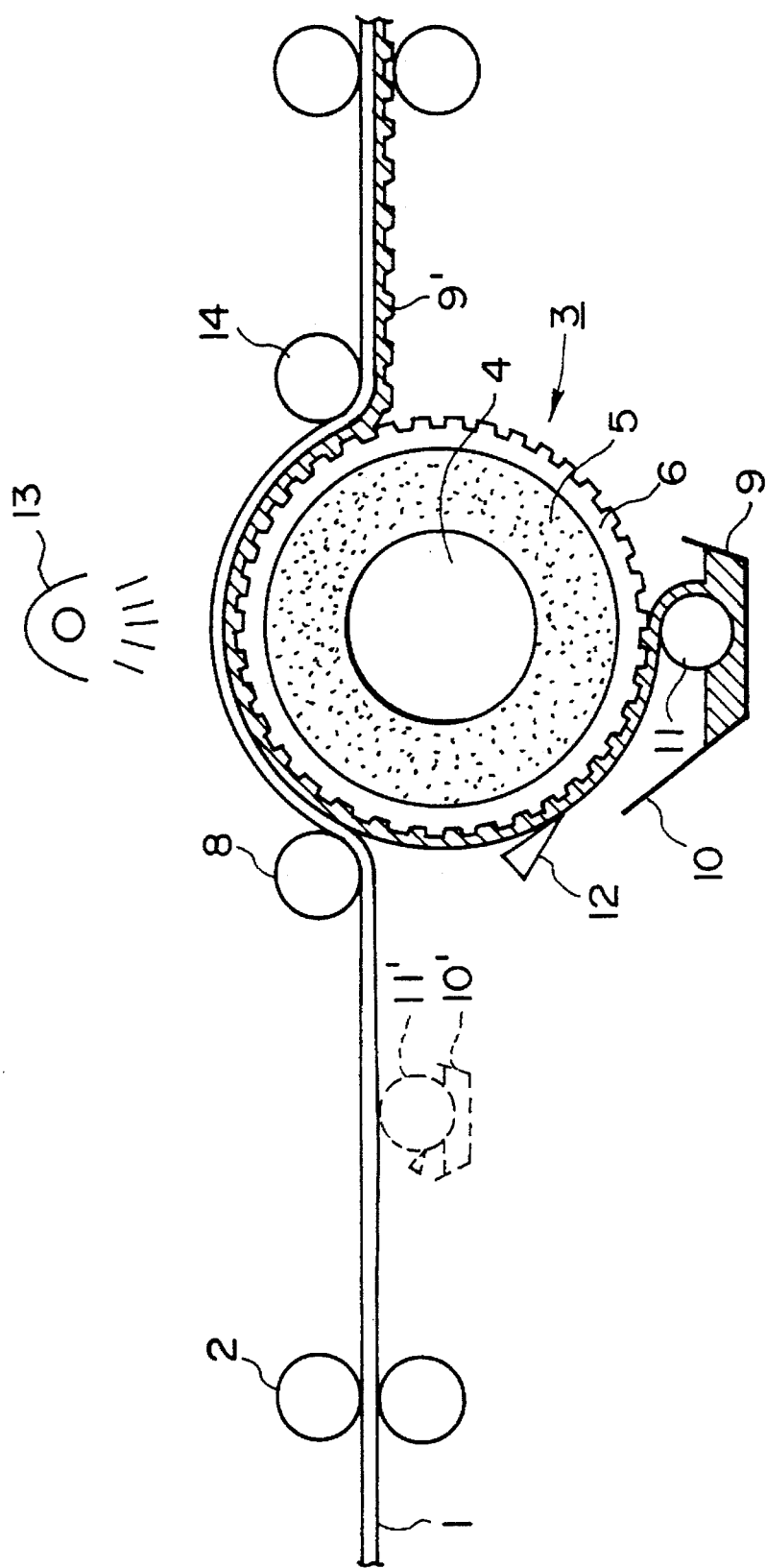
FIGS. 1 and 2 illustrate preferred embodiments of the apparatus of the present invention for producing a substrate sheet for optical recording mediums.

FIG. 1 illustrates the constitution of an example of the apparatus of the present invention, used in the process for continuously producing a substrate for optical recording mediums. In FIG. 1, a substrate sheet 1 is so constituted as to be fed from feed rolls 2. There are no particular limitations on the substrate sheet 1 so long as it is flexible. For example, it is possible to suitably use plastic sheets made of polycarbonate, an acrylic resin, a polyolefin resin, a polyester resin, an epoxy resin or the like. A primer layer may also be formed on the surface of the substrate sheet 1 in order to increase the adhesion to a photo-curable resin 9.

A roll stamper 3 has patterns formed on its surface, corresponding with preformatting information, and is so constituted as to undergo elastic deformation when brought into close contact with the substrate sheet 1, interposing the photo-curable resin layer.

A resin tank 10 holding therein a liquid photo-curable resin 9 which is curable as a result of irradiation with, e.g., ultraviolet rays is provided below the roll stamper 3. In this resin tank 10, a coating roll 11 that rotates in pressure contact with the surface of the roll stamper 3 is provided so that the photo-curable resin 9 in a liquid state is applied to the surface of the roll stamper 3. A resin layer 9' thus formed by coating is regulated with a blade 12 to have a uniform thickness, and then held between the substrate sheet 1 and the roll stamper 8 by means of a nip roll 8.

Subsequently, using an ultraviolet lamp provided above the roll stamper 3, the photo-curable resin layer held between the substrate sheet 1 and the roll stamper 3 is irradiated with ultraviolet rays so that the photo-curable resin is cured. Then, a photo-cured resin layer 9' thus formed is peeled from the roll stamper 3 by the aid of a delivery roll 14. Thus a substrate sheet for optical recording mediums can be obtained in which the preformat patterns of stampers have been transferred to the photo-curable resin layer on the substrate sheet.

In the present invention, the roll stamper capable of undergoing elastic deformation can be prepared in the manner, for example, as shown in FIG. 1, where an elastic material layer (an elastomer layer) 5 is provided on the periphery of a core 4 made of a metal to form an elastic roll, and then a flat-sheet stamper 6 made of Ni, of from 0.1 to 0.3 mm in thickness, is adhered with an adhesive or mechanically fixed with screws or the like on the periphery of the elastic roll along its surface. Thickness of the elastomer layer 5 may vary depending on the materials used, and may preferably be usually in the range of from 0.1 to 100 mm, and particularly from 0.5 to 50 mm.

The elastic material used here should have a smaller hardness than at least the metal core 4. Specifically, it may preferably has an hardness of from 5 to 100, and particularly from 10 to 80, according to JIS-A hardness so that the patterns can be transferred in a high accuracy and also no bubbles may be included in the photo-curable resin layer or at the interface between the photo-curable resin layer and the substrate sheet when the substrate sheet is brought into close contact with the roll stamper. Materials therefor specifically include, for example, elastomers such as polyurethanes, natural rubber, isoprene rubber, chloroprene rubber, and silicone rubber.

Figure 2:
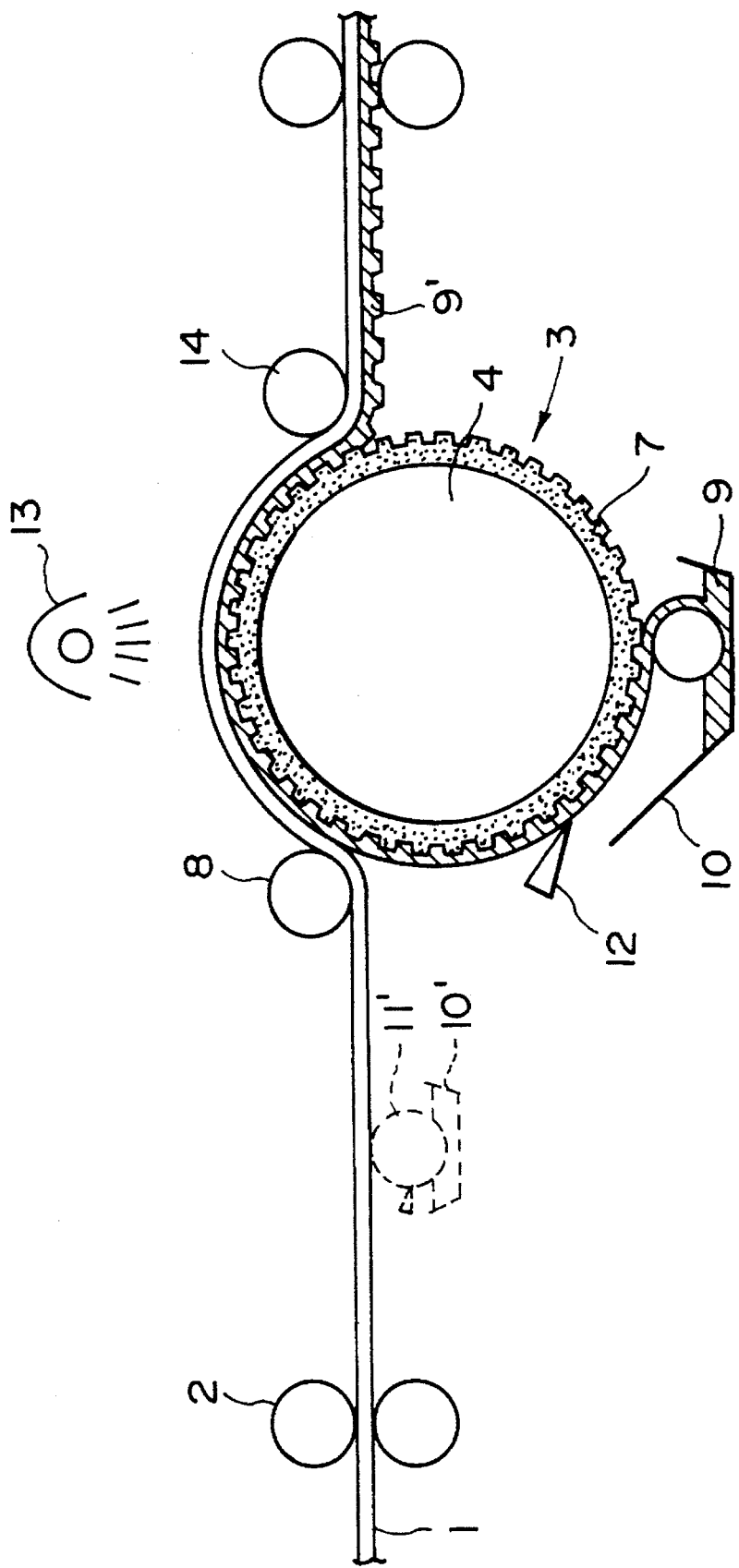

The roll stamper can also be prepared in the manner as shown in FIG. 2, where on the periphery of a core 4 made of a metal a stamper 7 comprising an elastic material is adhered along its surface or directly set and molded on the core.

The stamper used here, comprising an elastic material, includes, for example, stampers made of elastic resins such as silicone resin and fluorine resin. The stamper used here may preferably have a thickness of from 0.1 to 50 mm, and particularly from 0.5 to 10 mm. It also may preferably have a hardness of from 10 to 100, and particularly from 30 to 90, according to JIS-A hardness, from the viewpoint of good transfer of patterns and prevention of inclusion of bubbles.

In the preformat pattern formed on the roll stamper, that corresponds with preformatting information, the preformatting information refers to, for example, tracking grooves and/or encoded information in the form of readable marks. It specifically refers to a spiral track groove for an optical disk, having dimensions of, for example, a width of from 0.2 µm to 3.0 µm and particularly from 0.5 µm to 2 µm, and a pitch of from 0.1 µm to 15.0 µm and particularly from 1.0 µm to 5 µm; stripe-like track grooves for an optical card, of a width of from 1 µm to 10 µm and particularly from 2 µm to 5 µm, and an interval of from 5 µm to 20 µm and particularly from 8 µm to 15 µm; or rectangular minute information pits of a length of 10 µm or less and a width of 10 µm or less, or elliptical information pits of a major axis of 10 µm or less.

As materials for the metal core used in the present invention, it is possible to use metal semiconductors, dielectrics or alloys, and particularly preferably aluminum, hard metals, diecast metals, etc. which can be readily mirror-finished. Cr steel can be particularly preferably used.

The outer diameter of the roll stamper may vary depending on the material and thickness of the substrate sheet 1. For example, when an optical disk using a 1.2 mm thick polycarbonate is taking into account, the roll stamper 3 may preferably have a diameter of not less than 300 mm. It may preferably have a diameter of not less than 150 mm even when an optical disk made of a 0.4 mm thick polycarbonate is taken into account.

In FIG. 1, the photo-curable resin 9 in a liquid state is applied to the surface of the roll stamper 3 by means of the coating roll 11 that rotates in pressure contact with the surface of the roll stamper 3. The liquid resin thus applied is regulated with the blade 12 to have a uniform thickness, and then held between the substrate sheet 1 and the roll stamper 3 by means of a nip roll 8. In the present invention, the photo-curable resin layer may not be applied only to the surface of the roll stamper 3, and may alternatively applied to the surface at which the substrate sheet is opposed to the roll stamper. Still alternatively, it may also be applied to both the surfaces of the substrate sheet 1 and the roll stamper 3. In the case when the photo-curable resin is applied to both the surfaces of the substrate sheet 1 and the roll stamper 3, the step of adhering the substrate sheet to the roll stamper 3 is carried out in liquid-liquid contact, so that the bubbles can be much better suppressed from generation when the substrate sheet and roll stamper are brought into close contact, also bringing about an improvement in adhesion. This is hence preferred. In this instance, the photo-curable resin may preferably be applied to the substrate sheet 1 and/or the roll stamper 3 in a coating thickness of from 0.1 to 50 µm, and particularly from 1 to 30 µm, in order to prevent the substrate from its warpage due to cure shrinkage and improve transfer performance of preformat patterns.

The photo-curable resin 9 used in the present invention includes, for example, an ultraviolet-curable resin and an electron ray-curable resin.

The ultraviolet-curable resin that can be used includes prepolymers, oligomers and monomers, having an unsaturated bond in the molecule. For example, it is possible to use a mixture of i) one or mope kinds of an unsaturated polyester, an acrylate such as epoxy acrylate, urethane acrylate or polyether acrylate, and a methacrylate such as epoxy methacrylate, urethane methacrylate, polyether methacrylate or polyester methacrylate and ii) a photopolymerizable monomer having en unsaturated bond in the molecule, as exemplified by a functional monomer such as dicyclopentenyl acrylate, 1,3-butanediol acrylate, polyethylene glycol diacrylate or pentaerythritol acrylate. A radical-generating compound such as a halogenated acetophenone, benzophenone, benzoin, benzoin ether, Michler's ketone, benzyl, benzyl dimethyl ketal, tetramethylthiuram monosulfide or a thioxazone may also be used as a polymerization initiator. These may be any of those which can be readily peeled from a stamper when cured, and also can be well matched to a recording layer. There are no particular limitations on the coating of the liquid photo-curable resin 9 on the roll stamper 3, and the coating roll 11 may be replaced by a dispenser nozzle or any other conventional coating means used in printing, from which a suitable means may be selected depending on the viscosity and coating thickness.

Figure 3:
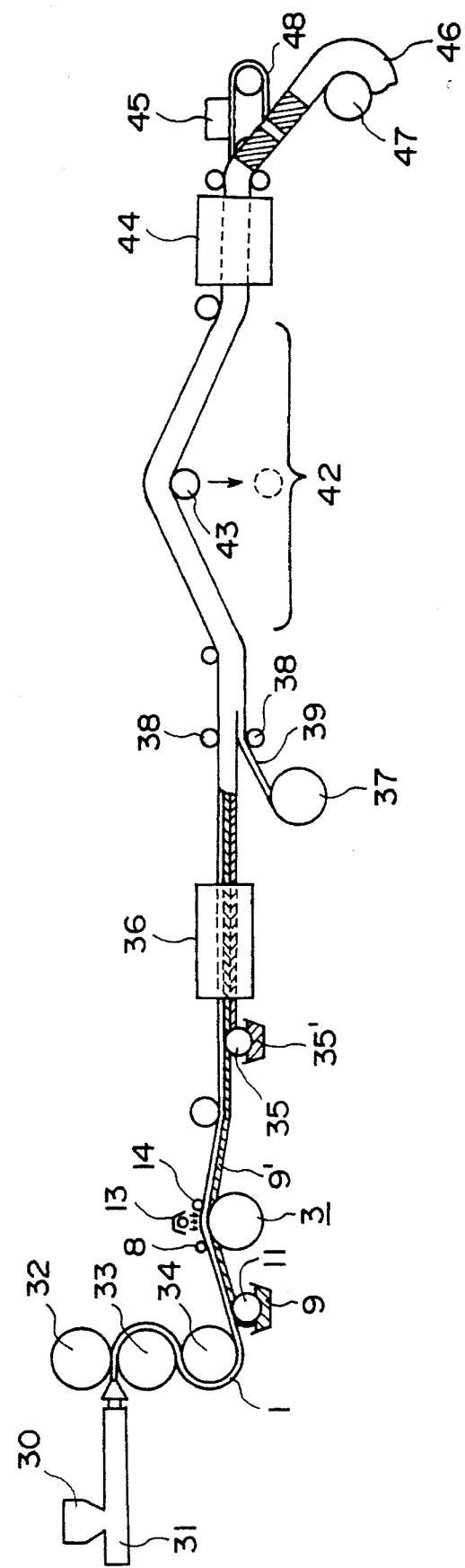
FIG. 3 schematically illustrates an embodiment of the apparatus of the present invention for producing optical recording mediums.
Figure 4:
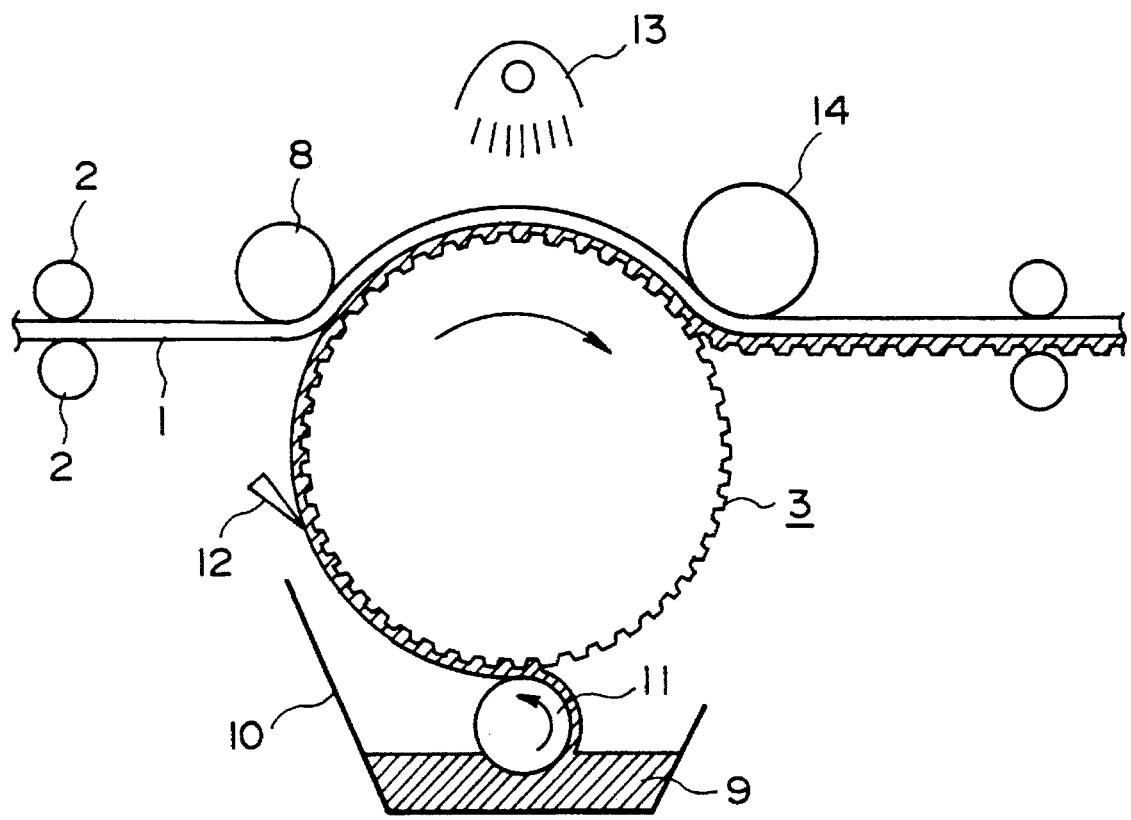
FIG. 4 schematically illustrates a conventional process for optical recording mediums according to the 2P process.

In the present invention, the step of forming the substrate sheet 1 by extrusion is provided, as shown in FIG. 3, before the step of transferring the pattern of preformatting information to the substrate sheet 1 having thereon the above photo-curable resin. After the step of peeling the substrate sheet to which the patterns corresponding with preformatting information have been transferred, steps are also continuously provided, including the step of forming a recording layer on the surface of a photo-cured resin layer on which the preformat pattern has been formed, the step of forming a protective layer on the recording layer, and the step of cutting the sheet into individual optical recording mediums. Thus, optical recording mediums having a high reliability can be produced in a good mass-productivity and at a low cost.

These steps will be detailed below with reference to FIG. 3.

In FIG. 3, the numeral 31 denotes an extruder, into which pellets of the material for a substrate sheet 1 are put from a hopper 30. A molten resin is extruded in the form of a belt from a T-die connected to the extruder. With approach to an outlet of the T-die, the resin is lead to the gap between a roll 32 and a roll 33. A mirror surface is transferred to the underside surface of the substrate sheet 1 through means of a mirror-surface roll 33, and then a mirror surface is also transferred to another surface of the substrate sheet through means of a mirror-surface roll 34. The substrate sheet is thus formed.

Here, the molten resin extruded from the T-die in a sheet is held between the rolls 32 and 33 under pressure, so that the mirror surfaces are formed on its surfaces. At this time, the resin sheet may preferably be in a state near to molten as far as possible in order to carry out good transfer. Hence, the distance between the T-die and the point at which the resin sheet is pressed between the rolls 32 and 33 may preferably be not more than 50 cm, and particularly not more than 20 cm. The temperature in the surrounding atmosphere in that course may preferably be not lower than 60° C.

The resin sheet serving as the substrate sheet of the present invention may have a thickness variable with variations of the space between the rolls 32 and 33. In view of the advantages that little strain may be produced inside the resin sheet, the resin sheet may preferably have a thickness of from 0.2 mm to 2.0 mm, and particularly from 0.3 mm to 1.5 mm. A thickness less than 0.2 mm may cause rapid cooling of the resin sheet, resulting in an insufficient transfer. On the other hand, a thickness more than 2.0 mm tends to cause strain in the sheet.

The rolls 32, 33 and 34, on which the thickness of this sheet depends, are so set as to be as parallel as possible to each other in order to prevent the irregularities in sheet thickness that may cause errors in recording and reproduction. Stated specifically, assuming as θ the angle formed by the axis of each roll, it is preferred that $\tan\theta$ is $5\times10^{-3}$ or less, and particularly $1\times10^{-3}$ or less.

The extrusion speed of the resin sheet and the peripheral speeds of a roll stamper 3, the mirror-surface rolls 33, 34 and coaters 11, 35 may preferably be set equal. This is because no stress such as stretch is applied to the resin sheet and hence a resin sheet free from double refraction or the like and with superior optical characteristics can be obtained.

Next, the substrate sheet 1 thus formed is coated with a photo-curable resin 9 by means of a coater 11, and is subsequently brought into pressure contact with a roll stamper 3 capable of undergoing elastic deformation, having on its surface preformat patterns. The part brought into pressure contact is irradiated with an ultraviolet lamp 13, so that preformat patterns for track grooves or address pits are transferred to a photo-cured resin layer.

Next, the numeral 35 denotes a coater for coating a recording layer material on the surface of the photo-cured resin layer 9' on which the preformat patterns have been formed. The recording layer material can be coated using various printing methods. In the most simple method, as shown in FIG. 3, an ink obtained by dissolving in a suitable solvent a dye serving as a recording material is held in an ink reservoir denoted by 35' and is fed through a single roll 35 to the surface of the photo-cured resin layer 9' on which the preformat patterns have been formed.

Here, the recording layer material may preferably be coated from the underside of the substrate sheet. Namely, in principle, the recording layer material can be coated on the top surface side if a manufacture environment is kept perfectly clean, but it is impossible in reality to completely eliminate dust. Hence, the underside coating is very effective for preventing dust.

Next, the substrate sheet is passed through a tunnel dryer denoted by 36 to remove a solvent from the coating surface, and then a protective member 39 is formed. The protective member can be formed by various methods including (1) a method in which a protective substrate or film is directly laminated on a recording layer, (2) a method in which a protective film is directly formed on the surface on which a recording layer has been formed, and (3) a method in which an air layer is provided above the surface on which a recording layer has been formed, and then a protective member is laminated thereon.

In the apparatus shown in FIG. 3, a protective sheet 39 is fed from a feed roll denoted by 37, and the protective member is laminated using a pressure roll 38. This process can be applied in the direct lamination as in the above method (1) or the lamination via an air layer as in the method (3). The protective substrate for use in the lamination in the method (3) is provided with a spacer at the outside of a recording area, and is previously processed to have concavities and convexities on a surface on the protective member side so that a given air layer can be retained at the time of lamination. Here is used a member separately obtained by processing a protective sheet by vacuum forming to have concavities and convexities on the surface, and wound up in a spiral form. Alternatively, in place of the process for providing the concavities and convexities, an adhesive with beads may be used, which is applied to the outer perimeter and/or inner perimeter of the outside of a recording area, and then a protective member is laminated thereon.

As the method in which a protective member is directly formed on a recording layer, there is, for example, a method in which a hot-melt adhesive is applied between the resin sheet and the protective member, and then a heat roll is passed through to make a lamination. They may be laminated by adhesion using an adhesive, by joining using a pressure-sensitive tape that also serves as a spacer, and, in addition thereto, by direct melt adhesion between the substrate and the protective member, using an ultrasonic welder or a hot press.

Next, the sheet thus provided with the protective member is separated into individual optical recording mediums by means of a cutting machine 44. The optical recording mediums thus separated (45) are delivered on a conveyor belt 48. A residual material 46 remaining after the cutting of optical recording mediums is wound up on a drum 47. The cutting is carried out by male-female type punching using an oil hydrauric press.

In the present invention, the substrate sheet is processed in the state of a continuous sheet, and hence the substrate sheet itself is moved until it reaches the step of cutting. Thus, it can be delivered by only a relatively simple roll transport system.

An automatical alignment or positioning mechanism may be optionally provided in the step of laminating the substrate sheet and the protective member or the step of punching the optical recording mediums. More specifically, since, in the instance where the air layer is provided using a backing material, a member is laminated at the outside of a recording area, the right-and-left positional movement or forward-and-backward feeding is controlled so that the position at which a preformat pattern is formed can be detected and the concavity and convexity of the backing material can be made to positionally correspond thereto.

The cutting step is required to be accurate particularly when optical disks are prepared, where the inner perimeter or outer perimeter of an optical disk is detected using reflected light of a laser spot or a position signal is detected with a CCD by reading a groove on a substrate or a marker specially provided thereon, according to which a punching press is moved.

In order to operate these positioning mechanisms in an adequate degree of freedom, the sheet is fed in a "loosened" state to a certain degree. The embodiment as shown in FIG. 3, in which the coating surface is provided on the underside of the sheet, is advantageous for preventing dust from adhering to the coating surface. However, used as a delivery roll should be a roll to hold the sheet at its side edges so that the roll may not be in touch with the coating surface correspondind to a recording surface.

Incidentally, the cutting of optical recording mediums, finally carried out among the steps shown in FIG. 3, can be carried out in a sufficiently short time. When the above marker for cutting is used, the substrate sheet may preferably be stopped so that the sheet can be cut in an improved accuracy. On the other hand, at the time when the substrate sheet resin is melt-extruded, the preformat patterns are formed and the recording layer is formed, the sheet should preferably be formed and delivered at a constant speed in order to prevent defects such as non-uniformity in the substrate sheet thickness, occurrence of strain in the substrate sheet, faulty transfer of a preformat pattern, and coating uneveness of a recording layer.

Then, a mechanism of loosening the substrate sheet may preferably be provided before the cutting step so that the steps through which the sheet is fed in a continuous state and the step in which the substrate sheet is stopped and cut can be successively carried out.

In FIG. 3, the numeral 42 denotes a loosening mechanism, in which the position of a roll is changed up and down by spring so that the steps through which the sheet is continuously delivered, ranging from the step of extruding the resin up to the step of laminating the protective member, and the cutting step in which the sheet is intermittently fed can be continuously carried out in the state that both the steps are remain connected.

In addition to the steps shown in FIG. 3, a step of removing static charges and dust may be further optionally inserted so that the substrate sheet on which the preformat patterns have been formed can be prevented from attraction of dust due to static charge thereof. From the viewpoint of preventing the attraction of dust, it is also preferable to cover with a clean tunnel the desired sections ranging, for example, from the section at which the substrate sheet resin is melt-extruded, to the section corresponding to the step of forming the protective member.

Materials used for an optical recording layer may vary depending on whether the optical recording medium of the present invention is used for an ROM (read-only memory) in which the information previously formed on a substrate as preformatting information can only be read, or used for a memory in which additional information can be written. In the case of the former ROM, the recording layer may preferably have a higher reflectance, and, for example, a material comprising metal fine particles dispersed in a binder, or a heat-resistant dye or pigment may be used. In the latter case, it is preferable to use a material having both absorption and reflection to recording-reproducing light, and requiring a smaller energy necessary for causing changes in reflectance as a result of irradiation with energy beams. It is further preferable to use a material that may cause changes in reflectance with difficulty, at the recorded areas (pits, etc.) and unrecorded areas.

Such an optical recording material includes, for example, anthraquinone derivatives (particularly those having an indanthrene skeleton), dioxazine compounds and derivatives thereof, triphenodithiazine compounds, phenanthrene derivatives, cyanine compounds, merocyanine compounds, pyrylium compounds, xanthene compounds, triphenylmethane compounds, chroconium coloring matters, azo coloring matters, chrocones, azines, indigoids, polymethine coloring matters, azulenes, squarilium derivatives, sulfur dyes, and metal dithiolate complexes.

These coloring matters may also be mixed with stabilizers. Such stabilizers include various types of metal chelate compounds, in particular, those comprising a multidentate ligand having a central metal such as Zn, Cu, Ni, Cr, Co, Mn, Pd and Zr, as exemplified by tetradentate ligands having $N_4$, $N_2O_2$, $N_2S_2$, $S_4$, $O_2S_2$, $O_4$, etc., or a combination of these, as well as various types of aromatic amines or diamines, nitrogen-containing aromatics, and onium salts thereof as exemplified by aminium salts, diimonium salts, pyridinium salts, imidazolinium salts, and quinolium salts. Pyrylium salts or the like which are salts of oxygen-containing aromatics may also be used. These stabilizers can be used in combination of plural ones.

The above various stabilizers are selected taking account of the compatibility with the above organic coloring matters and solvents used. The stabilizer may preferably be added in an amount of from 1 wt. % to 50 wt. % based on the organic coloring matter. In particular, when added in an amount of from 10 wt. % to 30 wt. %, the lowering of sensitivity can be less and the effect as the stabilizer can be high.

Solvents used in dissolving the above organic coloring matters and stabilizers may preferably include those which may not attack the resin sheet. It is possible to use diacetone alcohol, cellosolve, and 1-methoxy-2-propanol, and also mixed solvents composed of any of the above solvents to which a solvent of a halogen type has been added in a small amount.

The sheet-like optical recording medium prepared in this way is then cut or punched out to be formed into individual optical disks or optical cards, depending on the preformat signals to be recorded.

In practical use, steps of labeling, lot number printing, casing, and so forth may be optionally added in the course of these steps or after completion of the steps. An inspection step, and a feed back based on the inspection may also be optionally provided. For example, as an optical inspection, a means for inspecting double refraction, reflectance or light-transmittance of a medium or a coating film, or defects such as scratches and inclusion of dust, a means for measurement for judging the quality of sheet thickness or grooves formed, and a means for evaluating the performance as a disk or card, can be provided in the course of or after the steps.

As having been described above, according to the present invention, which employs as the roll stamper a roll stamper capable of undergoing elastic deformation, a substrate sheet for optical recording mediums, that can prevent bubbles from being included in a photo-curable resin layer and is improved in the follow-up action between a roll stamper and a substrate sheet so that the rate of errors can be decreased, can be produced continuously and in a high productivity.

EXAMPLES

The present invention will be described below in greater detail by giving Examples.

Example 1

A photoresist (trade name: AZ-1300; a product of Hoechst Japan Ltd.) film was formed on a glass master to have a film thickness of 1,000 Å, followed by exposure using a laser beam cutting device and then developing to form a preformat pattern comprised of concavities and convexities. Next, on the pattern thus formed, an Ni thin film was formed by sputtering so that its surface was made conductive, and thereafter an Ni deposit of 0.1 mm in thickness was formed by electroforming. Next, the Ni deposit was peeled from the glass master. Flat sheet stampers made of Ni, used for 3.5 inch optical disks were thus obtained, each having a preformat pattern in a spiral form of 0.6 μm in groove width, 1.6 μm in pitch and 900 Å in groove depth.

On the other hand, on the periphery of a stainless steel core of 350 mm in outer diameter and 15 mm in width, whose surface had been mirror-finished, an elastomer layer 5 made of chloroprene rubber was formed with a thickness of 50 mm by wrap-and-steam molding so as to give an outer diameter of 400 mm. A rubber roll was thus prepared.

Next, using an epoxy adhesive (trade name: EP170; a product of Camedine Co., Ltd.), 12 pieces of the flat sheet stampers made of Ni, thus obtained, were stuck fast in a row on the periphery of the above rubber roll. A roll stamper was thus prepared.

A polycarbonate substrate sheet of 1.2 mm in thickness and 130 mm in width was used as the substrate sheet 1. An ultraviolet-curable resin of an epoxy acrylate type (MRA-5000, a product of Mitsubishi Rayon Co., Ltd.) was applied to the pattern surface of the roll stamper to give a thickness of 25 μm. The substrate sheet was fed at a speed of 2.5 m/min. The substrate sheet was brought into close contact with the roll stamper by means of the nip roll. Thereafter, the ultraviolet-curable resin layer thereby spread out was irradiated with ultraviolet rays (a 4 kW high-pressure mercury lamp, 300 mW/cm$^2$) for 15 seconds over the whole surface of the substrate sheet, and the ultraviolet-curable resin layer was thus cured and made to be in close contact with the substrate sheet.

Next, the substrate sheet and the ultraviolet-cured resin layer formed thereon were peeled from the roll stamper. Thus, a substrate sheet having a track groove pattern of 0.6 μm in groove width, 1.6 μm in pitch and 900 Å in groove depth was obtained. No defective bubbles were visually seen on the substrates thus obtained. A mask was covered on this substrate sheet and then disk substrates were cut therefrom using a $CO_2$ laser cutter. The rate of errors of the substrates was measured to reveal that an average value of 10 pieces was $5 \times 10^{-6}$.

Comparative Example 1

Disk substrates with preformat patterns were obtained according to the same procedure as in Example 1, except that a roll stamper comprising a stainless steel roll of 400 mm in outer diameter on the surface of which flat sheet stampers made of Ni were stuck with an epoxy adhesive. Some bubbles were seen in the substrates thus obtained. The rate of errors thereof was measured to reveal that an average value of 10 pieces was $6 \times 10^{-5}$.

Example 2

A photoresist (trade name: AZ-1300; a product of Hoechst Japan Ltd.) film was formed on a glass master to have a film thickness of 3,000 Å, followed by exposure using a laser beam cutting device and then developing to form a preformat pattern corresponding with track grooves for an optical card. Next, on the pattern thus formed, a silicone resin (trade name: KE10; a product of Shin-Etsu Silicone Co., Ltd,) was coated in a thickness of 5 mm. The resulting coating was cured at 60° C. for 3 hours, and then peeled from the glass master. Stampers made of silicone resin, used for optical cards were thus obtained, each having a preformat pattern corresponding with tracking grooves for an optical card, which are in a stripe form of 3 μm in groove width, 12 μm in pitch and 3,000 Å in groove depth.

Using a silicone resin adhesive (trade name: KE41; a product of Shin-Etsu Silicone Co., Ltd.), 10 pieces of the stampers thus obtained were stuck fast in a row on the surface of a core roll made of stainless steel, of 200 mm in outer diameter and 130 mm in width. A roll stamper was thus prepared.

Using this roll stamper, an apparatus as shown in FIG. 2 for producing a substrate sheet for optical cards was made up.

A polycarbonate substrate sheet of 0.4 mm in thickness and 120 mm in width was used as the substrate sheet. The substrate sheet was fed at a speed of 3 m/min, followed by the same procedure as in Example 1. A substrate sheet for optical cards having stripe-like tracking grooves of 3 μm in groove width, 12 μm in pitch and 3,000 Å in groove depth was thus obtained. No defective bubbles were seen on the substrates thus obtained. The rate of errors of the card substrates was measured to reveal that an average value of 10 pieces was $7 \times 10^{-6}$.

Example 3

A roll stamper was prepared in the same manner as in Example 2, except that a pattern corresponding with stripe-like tracking grooves for an optical card, of 2.5 μm in groove width, 12 μm in pitch and 3,000 Å in groove depth was formed as the preformat pattern formed on the roll stamper 3. Using this roll stamper, an apparatus as shown in FIG. 3 for producing optical cards was made up.

Using pellets of polycarbonate having an average molecular weight of 25,000, a substrate sheet was formed under conditions of an extrusion width of 200 mm, a roll gap of 0.4 mm and an extrusion speed of 3 m/min. Subsequently, this substrate sheet 1 was coated with an ultraviolet-curable resin 9 in a coating thickness of 30 μm, using a roll coater 11. Polyurethane acrylate (trade name: UVX-SS120; a product of Three Bond Co., Ltd.) was used as the ultraviolet-curable resin.

The resin stampers stuck on the roll stamper 3 were 90 mm×60 mm in dimensions for each stamper, which are large enough to cover an optical card (85 mm×54 mm), and a pattern was formed in an area of 85 mm×30 mm.

Next, the roll stamper 3 was brought into close contact with an ultraviolet-curable resin layer 9', and irradiated with light at an intensity of 100 W/cm using an ultraviolet lamp 13 at a distance of 50 mm. Preformat patterns were thus transferred and fixed to an ultraviolet-cured resin layer.

Next, a recording layer was formed by coating using a roll coater 35 so that it was formed over the whole surface of the substrate sheet on which the tracking grooves were formed. A solution obtained by dissolving a polymethine dye (trade name IR-820; a product of Nippon Kayaku Co., Ltd.) in diacetone alcohol in a concentration of 2 wt. % was used as a recording layer coating solution 35'.

The recording layer was dried in the following manner: Dried air passed through an air filter of 0.2 μm thick, heated to 30° C., was flowed at a speed of from 1 m/min to 5 m/min so that a laminar flow was produced in a tunnel of 3 m, from the direction opposite to the flow of the sheet.

Next, as a protective member 39, a polycarbonate sheet of 0.25 mm thick was superposed on the substrate sheet on which the recording layer was formed, interposing a film-like hot-melt adhesive between them, which were then laminated through a heated press roll 38 to give a total thickness of 0.7 mm. The resulting sheet was punched using a press cutting machine 44 along cut markers previously formed (which were formed at the same time with the formation of preformat patterns).

It was possible to cut the sheet in sufficiently short time. Since, however, the sheet was not continuously fed, the mechanism of "loosening" the sheet was provided between the formation of the protective member and the cutting so that the sheet can be continuously fed.

The rate of errors of the optical cards thus prepared was measured to reveal that an average value of 10 pieces was $6 \times 10^6$.

What is claimed is:

1. An apparatus for producing a substrate for an optical recording medium having preformatting information on a surface of the optical recording medium, said apparatus comprising:

a roll stamper having on its periphery a preformat pattern corresponding to the preformatting information;

a nip roll disposed opposite to said roll stamper;

means for feeding an elongated sheet to a nip formed by said roll stamper and said nip roll;

means for feeding a liquid photo-curable resin layer between the sheet and said roll stamper periphery; and means for curing the liquid photo-curable resin layer while the photo-curable resin layer is in continuous close contact with the periphery of said roll stamper;

said roll stamper comprising a core roll made of metal which has an elastomer layer on its periphery and a flat-sheet stamper, made of metal and having said preformat pattern, fixed on said elastomer layer, said elastomer layer having a hardness of from 10 to 80 according to JIS-A-hardness.

2. An apparatus for producing a substrate for an optical recording medium according to claim 1, wherein said elastomer layer has a thickness of from 0.1 mm to 100 mm.

3. An apparatus for producing a substrate for an optical recording medium according to claim 2, wherein said elastomer layer has a thickness of from 0.5 mm to 50 mm.

4. An apparatus for producing a substrate for an optical recording medium according to claim 1, wherein said elastomer layer comprises at least one elastomer selected from the group consisting of a polyurethane, a natural rubber, an isoprene rubber, a chloroprene rubber and a silicone rubber.

5. An apparatus for producing a substrate for an optical recording medium according to claim 1, wherein said roll stamper has on its surface a preformat pattern corresponding with preformatting information.

6. An apparatus for producing a substrate for an optical recording medium having preformatting information on a surface of the optical recording medium, said apparatus comprising:

a roll stamper having on its periphery a preformat pattern corresponding to the preformatting information;

a nip roll disposed opposite to said roll stamper;

means for feeding an elongated sheet to a nip portion formed by said roll stamper and said nip roll;

means for feeding a liquid photo-curable resin layer between the sheet and said roll stamper periphery;

means for curing the liquid photo-curable resin layer while the photo-curable resin layer is in continuous close contact with the periphery of said roll stamper;

means for peeling the sheet with the photo-cured resin layer adhered thereto from said roll stamper;

means for forming a recording layer on the surface of the sheet to which the photo-cured resin layer has been adhered;

means for forming a protective member over the recording layer; and means for cutting the sheet having the recording layer and the protective member;

said roll stamper comprising a core roll made of metal which has an elastomer layer on its periphery and a flat-sheet stamper, made of metal and having said preformat pattern, fixed on said elastomer layer, said elastomer layer having a hardness of from 10 to 80 according to JIS-A-hardness.

7. A method for producing a substrate for an optical recording medium having preformatting information on a surface of the optical recording medium by using an apparatus that comprises a roll stamper having on its periphery a preformat pattern corresponding to the preformatting information and a nip roll disposed opposite to the roll stamper, wherein the roll stamper comprises a core roll made of metal that has an elastomer layer on its periphery and a flat-sheet stamper, made of metal and having the preformat pattern, fixed on the elastomer layer, the elastomer layer having a hardness of from 10 to 80 according to JIS-A-hardness, said method comprising the steps of:

feeding a sheet to a nip formed by the roll stamper and the nip roll;

feeding a liquid photo-curable resin layer between the sheet and the roll stamper periphery;

curing the liquid photo-curable resin layer while the photo-curable resin layer is in continuous close contact with the periphery of the roll stamper; and peeling the sheet with the photo-cured resin layer adhered thereto from the roll stamper.

8. A method for producing an optical recording medium having preformatting information on a surface of the optical recording medium by using an apparatus that comprises a roll stamper having on its periphery a preformat pattern corresponding to the preformatting information and a nip roll disposed opposite to the roll stamper, wherein the roll stamper comprises a core roll made of metal that has an elastomer layer on its periphery and a flat-sheet stamper, made of metal and having the preformat pattern, fixed on the elastomer layer, the elastomer layer having a hardness of from 10 to 80 according to JIS-A-hardness, said method comprising the steps of:

feeding a sheet to a nip portion formed by the roll stamper and the nip roll;

feeding a liquid photo-curable resin layer between the sheet and the roll stamper periphery;

curing the liquid photo-curable resin layer while the photo-curable resin layer is in continuous close contact with the periphery of the roll stamper;

peeling the sheet with the photo-cured resin layer adhered thereto from the roll stamper;

forming a recording layer on the surface of the sheet to which the photo-cured resin layer has been adhered;

forming a protective member over the recording layer; and cutting the sheet having the recording layer and the protective member.

* * * * *

UNITED STATES PATENT AND TRADEMARK OFFICE
CERTIFICATE OF CORRECTION

PATENT NO. : 5,480,596
DATED : January 2, 1996
INVENTOR(S) : YUKITOSHI OKUBO, ET AL.

It is certified that error appears in the above-indentified patent and that said Letters Patent is hereby corrected as shown below:

ON THE COVER PAGE

[56] References Cited

U.S. PATENT DOCUMENTS

"4,294,782 10/1981 Froehliz" should read --4,294,782 10/1981 Froehlig--.

[57] ABSTRACT

Line 3, "an" should read --a--.

COLUMN 1

Line 28, "pm," should read --$\mu$m,--.

COLUMN 3

Line 17, "an" should read --a--.

COLUMN 4

Line 49, "reference" should read --reference to--.

COLUMN 5

Line 44, "an" should read --a--.

UNITED STATES PATENT AND TRADEMARK OFFICE
CERTIFICATE OF CORRECTION

PATENT NO. : 5,480,596

DATED : January 2, 1996

INVENTOR(S) : YUKITOSHI OKUBO, ET AL.

It is certified that error appears in the above-indentified patent and that said Letters Patent is hereby corrected as shown below:

COLUMN 6

Line 61, "mope" should read --more--; and
Line 66, "en" should read --an--.

COLUMN 7

Line 50, "course" should read --case--.

COLUMN 9

Line 12, "hydrauric" should read --hydraulic--.

COLUMN 10

Line 1, "are" should be deleted.

COLUMN 13

Line 48, "6 x $10^6$." should read --6 x $10^{-6}$.--.

Signed and Sealed this

Twenty-eighth Day of May, 1996

Attest:

BRUCE LEHMAN

*Attesting Officer*   *Commissioner of Patents and Trademarks*